Oct. 2, 1962     D. ORR     3,056,559
BEVERAGE DISPENSER
Filed Jan. 11, 1960     2 Sheets-Sheet 1
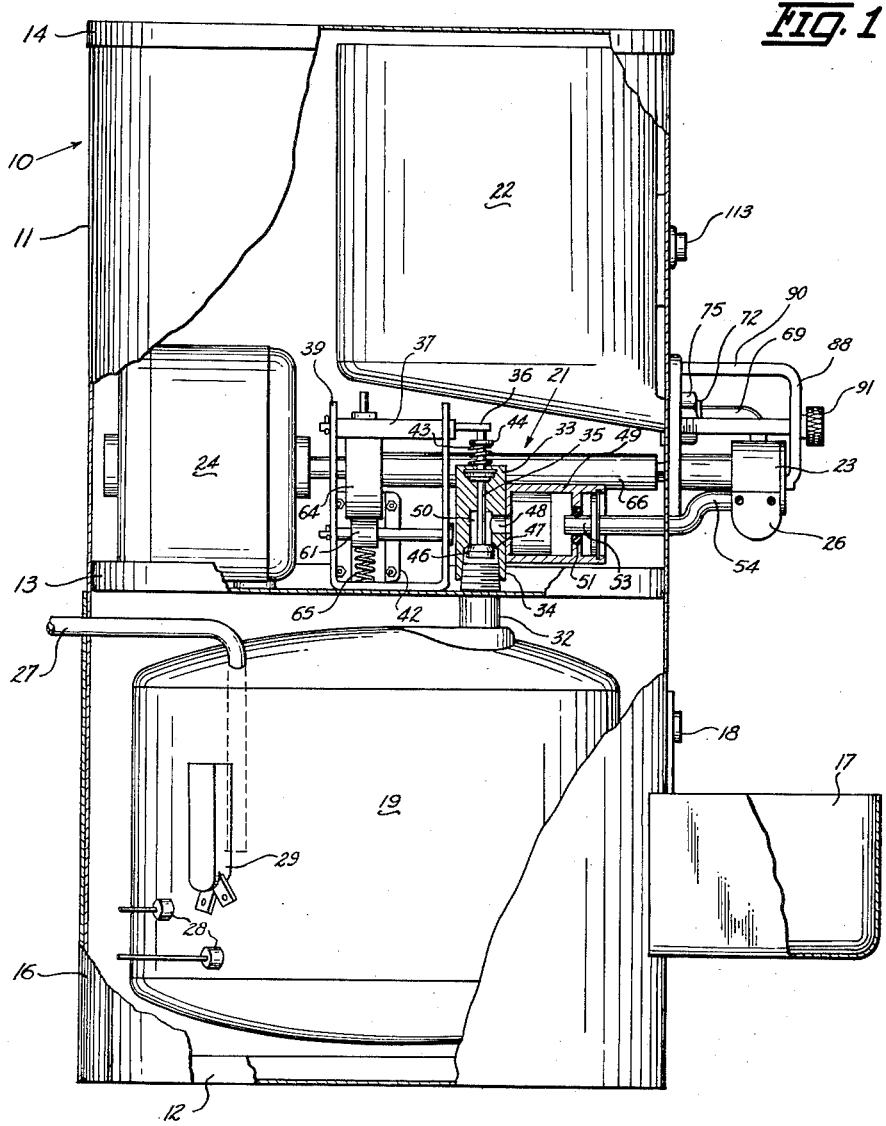
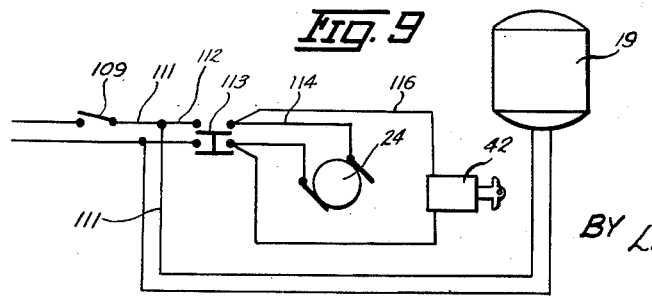
INVENTOR.
DONALD ORR
BY Lowell & Henderson
ATTORNEYS.

Oct. 2, 1962 D. ORR 3,056,559
BEVERAGE DISPENSER
Filed Jan. 11, 1960 2 Sheets-Sheet 2
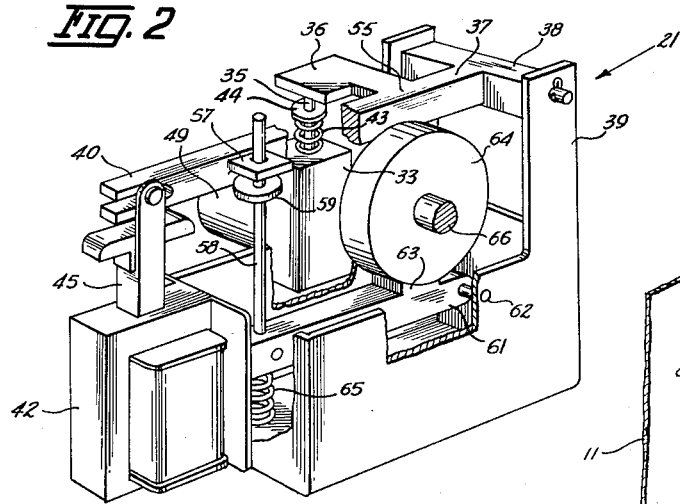
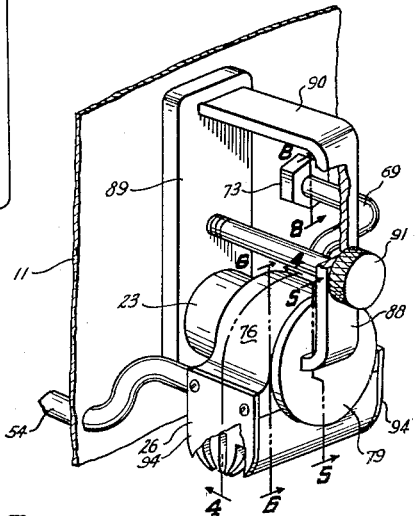
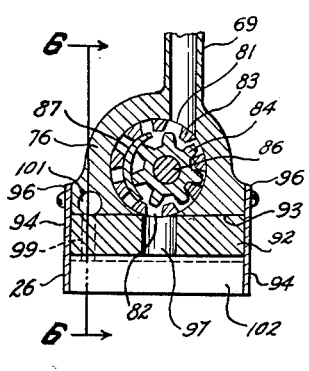
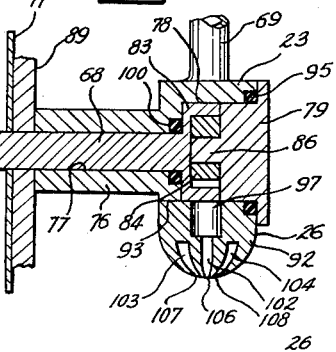
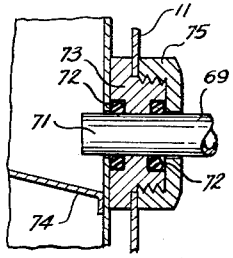
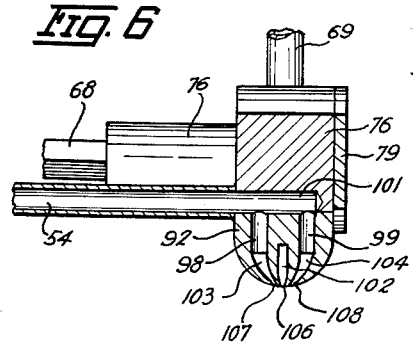
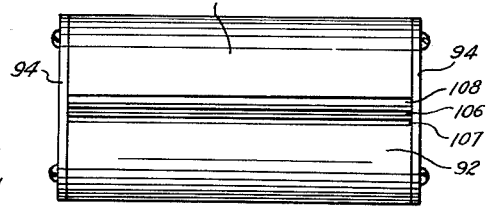
INVENTOR.
DONALD ORR
BY Lowell & Henderson
ATTORNEYS.

United States Patent Office 3,056,559
Patented Oct. 2, 1962

3,056,559
BEVERAGE DISPENSER
Donald Orr, Arnolds Park, Iowa
Filed Jan. 11, 1960, Ser. No. 1,776
1 Claim. (Cl. 239—306)

This invention relates generally to an apparatus for mixing and dispensing liquids, and in particular to a mixing apparatus for a beverage dispenser.

Although this invention is concerned with the mixing and dispensing of a hot chocolate beverage, the general application has to do with an apparatus for mixing a pair of liquids which, when mixed together, produce a beverage and wherein the liquids are drawn from separate reservoirs and intimately mixed together by a common discharge nozzle or mixing head.

It is an object of this invention, therefore, to provide an improved apparatus for mixing a pair of liquids.

Another object of this invention is to provide a mixing apparatus wherein each of two separately contained liquids are supplied under pressure to a mixing nozzle for separate discharge therefrom in intersecting sheet form sprays.

Still another object of this invention is to provide a mixing apparatus for a pair of liquids of different viscosities, wherein the liquids are discharged under pressure in a thin sheet form directed toward each other to effect maximum surface contact and intermixing of the liquids.

A further object of this invention is to provide an apparatus for mixing a beverage syrup with a beverage forming liquid of less viscosity which is of a compact and economical construction, efficient in operation to thoroughly mix the liquid with the syrup so as to eliminate any free syrup in the resultant beverage.

Further objects and other features and advantages of this invention will become apparent upon consideration of the following description when taken in conjunction with the accompanying drawings, wherein:

FIG. 1 is a side elevational view of a beverage dispenser incorporating the principles of the present invention, with some parts broken away and others shown in section for purposes of clarity;

FIG. 2 is an enlarged perspective detail view of a fluid regulating unit of the dispenser, with some parts broken away for clarity of illustration;

FIG. 3 is an enlarged perspective detail view of a combined fluid pressure and mixing unit of the dispenser, with some parts broken away for purposes of clarity;

FIG. 4 is a sectional view taken along the line 4—4 in FIG. 3;

FIG. 5 is a sectional view taken along the line 5—5 in FIG. 3;

FIG. 6 is a sectional view taken along the line 6—6 in FIG. 3;

FIG. 7 is an enlarged bottom plan view of the mixing head of this invention;

FIG. 8 is a sectional view taken along the line 8—8 in FIG. 3;

FIG. 9 is a schematic diagram of the electrical circuit of this invention.

Referring now to the drawings, the beverage dispenser of this invention is indicated generally at 10 in FIG. 1 and is housed in a circular frame structure 11 of sheet metal or the like having a reinforced bottom 12, an inside horizontal center support 13, and a removable top 14.

A panel, as at 16, may be provided in the rear of the frame structure 11 for removal, whereby to service and install the lower units within the structure 11. At the front of the structure 11, a drip pan 17 is provided, the pan being removably hung on one or more lugs 18 secured to the front of the frame structure 11. The dispenser 10 is designed as a relatively small, compact device intended to be placed upon a counter, table or other support and particularly designed for use in restaurants, lunch rooms, soda fountains and the like, although it will be noted that the size and details of the frame structure 11 are matters of choice and not of limitation.

The main components of the beverage dispenser 10 comprise a hot water heater 19, a discharge unit 21 for the hot water, a container 22 for chocolate in a syrup state, a pump 23 for discharging the syrup under pressure, an electric motor 24 for operating the pump 23, and a mixing nozzle 26 attached to the pump 23 for mixing the water and the syrup as they are discharged therefrom.

The heater 19 is of a commercial structure and is installed within the frame structure 11 in an insulated manner, and receives water from a public water supply system through a conduit 27. The water is heated by electrical resistance devices 28, and the temperature is controlled by a thermostat 29, or other means adjacent the discharge end of the water supply conduit 27. An outlet tube 32 is provided at the top of the heater 19 for supplying the heated water to the discharge unit 21.

The discharge unit 21 includes a regulating valve 33 (FIG. 1) the body 34 of which has an inlet 50 threadably mounted on the outlet tube 32, and a reciprocal valve stem 35 which extends upwardly within the inlet 50 to a position below and in contact with an actuating finger 36 (FIGS. 1 and 2) formed as part of a T-shaped pivot bar 37. The cross arm 38 of the bar 37 is pivotally mounted on an L-shaped bracket 39 supported on the center frame support 13, and the leg 55 of the bar 37 is normally maintained in an upper position, best indicated in FIG. 2, by the action of a compression spring 43 mounted between the top of the body 34 and a stop collar 44 secured to the valve stem 35. The free end 40 of the leg 55 is pivotally connected to a plunger 45 of a solenoid 42 secured to the bracket 39. When the plunger 45 is retracted as when the beverage dispenser 10 is not in use, the leg 55 is biased upwardly by the spring 43 whereby a valve head 46 (FIG. 1) secured at the lower end of the valve stem 35 is engaged with a valve seat 47 formed in the inlet 50, which has fluid communication with an outlet passage 48 formed in the body member 34. As a result, the flow of hot water from the outlet tube 32 through the discharge passage 48 is controlled by the action of the valve 46.

The discharge passage 48 is connected with the inlet end of a water pressure regulating valve 49 (FIG. 1) of a usual commercially available type, the outlet end of which is in a friction fluid sealed engagement with an end 53 of a water conduit 54. The sealed engagement of the conduit end 53 with the valve 49 is accomplished by the use of an O-ring seal 51 through which the end 53 is removably inserted.

Referring again to FIG. 2, the spring biased pivot bar 37, in addition to being provided with the finger 36 for the regulating valve 33, includes an ear 57 through which a stem 58 loosely extends. Spaced below the ear 57 is an abutment member 59 secured to the stem 58. Below the abutment member 59, one end of a braking bar 61 is secured to the stem 58, the other end being pivotally mounted at 62 to the L-shaped bracket 39. A brake shoe 63 is provided with the bar 61 for coaction with a brake drum 64 secured to a drive shaft 66, connected between the motor 24 and the pump 23. To maintain the shoe 63 against the drum 64, so as to provide a positive stop of the drive shaft 66 when the motor 24 is deenergized, a compression spring 65 (FIG. 2) is mounted between the bar 61 and the bracket 39. It is observed that in this upwardly biased position of the bar 61, the abutment member 59 is spaced slightly below the ear 57.

The pump 23 receives chocolate syrup through a conduit 69 (FIG. 3) the inlet end 71 (FIG. 8) of which is removably inserted through an O-ring seal 72 retained in a cap 73. The cap is secured to a lower corner 74 of the syrup container and extended through the frame 11 for retention by a nut 75. By this arrangement, the conduit 68 is adapted to permit the flow of syrup therethrough to the pump 23 by gravity.

The pump 23 is a commercially available positive displacement, rotary type fluid pump including a housing 76 (FIG. 3) having a longitudinal bore 77 (FIG. 5) formed therein for the pump drive shaft 68, and having also a circular chamber 78 formed therein which is closable at its outer end by a sealed cap 79. Drive is transmitted from the motor shaft 66 to the pump drive shaft 68 by means of a socket connection 80 therebetween. The pump chamber 78 has separate inlet and outlet ports 81 and 82, connected respectively, to the syrup conduit 69 and to the mixing nozzle 26. Within the chamber 78 is an open face drive gear 83 (FIGS. 4 and 5), integral with the shaft 68, and arranged for rotative coaction with an idler gear 84. The idler gear 84 rotates on a pin 86 secured to the inside of the cap 79 eccentrically to the shaft 68, and to which is also secured a crescent shaped head 87 (FIG. 4), the head splitting the flow of syrup as it moves toward the outlet port 82. The cap 79 is held in place against an O-ring seal 95 in the housing 76 by one end of a clamp 88, the other end 90 of which is held against a plate 89 secured to the frame structure 11, the clamp being retained by stud and nut device 91 threaded therethrough and into the plate 89 (FIG. 3).

The mixing nozzle 26 comprises a body 92 (FIGS. 4 and 5) having a substantially flat top 93 which is adapted to fit up against the base of the pump housing 76. The ends of the nozzle body 92 are fixed to a pair of end plates 94 the upper free flanges 96 (FIG. 4) of which are connected to the ends of the pump housing. Within the body 92, a central passage 97 (FIGS. 4 and 5) is formed which is open at the top 93 of the body so as to be aligned with the pump outlet port 82. A pair of transversely spaced passages 98 and 99 (FIG. 6) are also formed within the body 92 and which are also open at the top 93 thereof so that these passages are alignable and register with a bore 101 (FIGS. 4 and 6) formed in a side of the pump housing 76 for receiving hot water under pressure from the conduit 54.

The central syrup receiving passage 97 opens to a relatively narrow center or middle chamber 102 (FIGS. 4–6) extended the entire length of the nozzle body 92, and the transversely spaced passages 98 and 99 open, respectively, to a pair of outer or side chambers 103 and 104 spaced outwardly or transversely of the middle chamber 102 and also extended the entire length of the body 92 so as to be coextensive with the chamber 102. The outlet 106 (FIG. 6) for the middle chamber 102 is in the form of a slit and is coextensive in length with the chamber 102. Likewise, the side chamber outlets 107 and 108 are formed as slits, and are also coextensive in length with their respective chambers and with the middle outlet 106. The side outlets 107 and 108 are inclined toward each other and toward the middle outlet 106 for purpose hereinafter described.

To place the dispenser 10 in condition for operation, a main switch 109 (FIG. 9) is closed so as to connect the dispenser circuit to an outside power supply source. Current is directed through lines 111 to the heater resistance devices 28 for heating the water in the heater to the desired temperature. Current is also directed through leads 112 to a push button type switch 113 which is normally maintained open. With the switch 113 open, the motor 24 is not rotating and the gear pump 23 is therefore inoperative. As the solenoid 42 is not actuated, the water regulating valve 33 (FIG. 1) is closed due to the bias of the spring 43, and the brake shoe 63 is engaged with the motor drive brake 64 due to the spring 65, whereby to provide a positive brake on the shift 66.

When the switch 113 (FIG. 9) is closed, current is simultaneously directed through leads 114 and 116, respectively, to the motor 24 and to the solenoid 42. The latter acts to immediately pivot the bar 37 (FIG. 2) in a counter-clockwise direction, whereupon the finger 36 forces the regulating valve stem 35 downwardly to unseat the valve head 46 to permit hot water to flow from the heater outlet tube 32 through the regulating valve 49 and the conduit 54 to the mixer nozzle 26. Pivoting of the bar 37 (FIG. 2) also causes the ear 57 to engage the abutment member 59 to force the braking bar 61 downwardly whereby to release the brake shoe 63 from the brake drum 64.

At the motor 24, drive is transmitted through the pump drive shaft 68 (FIG. 5) to rotate the pump gears 83 and 84, whereby to withdraw syrup from the container 22 and to supply it under pressure to the mixing nozzle 26 at the pump outlet 82. By virtue of the outer seal 95 and an inner O-ring seal 100 between the gear 83 and the housing 76, seepage of the syrup under pressure is prevented. Thus, upon a closing of the switch 113, hot water under pressure is metered through the valve 49 to the mixing nozzle 26, and chocolate syrup is directed through the gear pump 23 where it is pressurized and discharged at a certain volume to the mixing nozzle 26.

Within the mixing nozzle 26, the middle chamber 102 fills with chocolate syrup which is then ejected through the outlet slit 106 in a thin sheet. The side chambers 103 and 104 are filled, simultaneously with the middle chamber 102, with hot water which is ejected through the respective outlets 107 and 108 in thin sheets. As the sheets or streams of water are inclined toward each other and toward the sheet or stream of chocolate, and as all three streams are coextensive in width, it is readily appreciated that when the water streams impinge against the chocolate stream, maximum surface contact between and among the streams is obtained. This relative inclined arrangement of the streams thus provides for a thorough mixing of water and syrup so that when the intermixed single flow or spray reaches a cup (not shown) or other container placed below the nozzle 26, no separate particles or globules of chocolate syrup remain.

An additional feature of the invention is the ease in removing the pump 23 and mixing nozzle for cleaning. By the provision of the seals 51 (FIG. 1) and 72 (FIG. 8) for the respective tubes 54 and 69, upon removing the device 91 (FIG. 3) and the clamp 88, the pump 23 and the mixing nozzle 26 may be easily pulled outwardly and separated from the remainder of the dispenser 10. After cleaning these parts, when assembled they may be readily slipped in place by inserting the ends 53 and 71 of the tubes 54 and 69 through their respective seals 51 and 72, and applying the clamp 88 and securing device 91.

Although only one embodiment of this invention has been disclosed herein, it is to be noted that various modifications and alternate constructions may be made without departing from the full spirit and scope of the invention as defined in the appended claim.

I claim:

Apparatus for mixing a chocolate syrup with hot water including a syrup container and a hot water container, an elongated body member formed with a pair of longitudinally extended transversely spaced liquid chambers, said chambers each having a longitudinally extended outlet of a slit form arranged adjacent each other in one side of said body member whereby liquid is discharged from said chambers in a sheet form, with one of said outlets being inclined toward the other outlet to provide for the discharge flow from one outlet impinging into and mixing with the flow from the other outlet, means for supplying syrup under pressure to one of said chambers, and other means for supplying hot water under pressure to the other of said chambers.

References Cited in the file of this patent

UNITED STATES PATENTS

| | | |
|---|---|---|
| 1,092,785 | Stene et al. | Apr. 7, 1914 |
| 1,316,528 | Wooten et al. | Sept. 16, 1919 |
| 1,392,450 | Rodgers | Oct. 4, 1921 |
| 1,407,543 | Hubbard | Feb. 21, 1922 |

FOREIGN PATENTS

| | | |
|---|---|---|
| 694,098 | Great Britain | July 15, 1953 |